US011898742B2

(12) United States Patent
Melzner

(10) Patent No.: US 11,898,742 B2
(45) Date of Patent: Feb. 13, 2024

(54) SPOTLIGHT LED LIGHT SOURCE

(71) Applicant: ARNOLD & RICHTER CINE TECHNIK GMBH & CO. BETRIEBS KG, Munich (DE)

(72) Inventor: Erwin Melzner, Frasdorf (DE)

(73) Assignee: ARNOLD & RICHTER CINE TECHNIK GMBH & CO. BETRIEBS KG, Munich (DE)

(*) Notice: Subject to any disclaimer, the term of this patent is extended or adjusted under 35 U.S.C. 154(b) by 0 days.

(21) Appl. No.: 17/640,783

(22) PCT Filed: Aug. 11, 2020

(86) PCT No.: PCT/EP2020/072506
§ 371 (c)(1),
(2) Date: Mar. 4, 2022

(87) PCT Pub. No.: WO2021/043543
PCT Pub. Date: Mar. 11, 2021

(65) Prior Publication Data

US 2022/0333762 A1 Oct. 20, 2022

(30) Foreign Application Priority Data

Sep. 6, 2019 (EP) .................................... 19195841

(51) Int. Cl.
*F21V 7/04* (2006.01)
*F21V 19/00* (2006.01)
(Continued)

(52) U.S. Cl.
CPC .......... *F21V 7/041* (2013.01); *F21V 19/0035* (2013.01); *F21W 2131/406* (2013.01);
(Continued)

(58) Field of Classification Search
CPC ........ H01L 33/60; F21Y 2113/10; F21V 7/04; F21V 7/0066; F21V 7/041; F21V 7/048
See application file for complete search history.

(56) References Cited

U.S. PATENT DOCUMENTS 2,686,866 A * 8/1954 Williams .................. F21S 8/04 362/231
7,794,121 B2 * 9/2010 Melzner .................... F21K 9/68 362/240
(Continued)

FOREIGN PATENT DOCUMENTS

AU 2017100996 A4 8/2017
CN 103109587 A 5/2013
(Continued)

OTHER PUBLICATIONS

CN Office Action dated Jun. 7, 2023 as received in Application No. 202080074134.1.
(Continued)

*Primary Examiner* — Ismael Negron
(74) *Attorney, Agent, or Firm* — Maschoff Brennan

(57) ABSTRACT

A light source for a spotlight includes a carrier, a plurality of LEDs of different colors arranged on the carrier, a lensless collector optical system for collecting and mixing light from the LEDs, an output optical system for projecting the light from the collector optical system, and a control device for controlling the LEDs.

19 Claims, 10 Drawing Sheets

(51) Int. Cl.

| | |
|---|---|
| *F21Y 105/12* | (2016.01) |
| *F21Y 113/10* | (2016.01) |
| *F21Y 115/10* | (2016.01) |
| *F21W 131/406* | (2006.01) |

(52) U.S. Cl.

CPC ....... *F21Y 2105/12* (2016.08); *F21Y 2113/10* (2016.08); *F21Y 2115/10* (2016.08)

(56) References Cited

U.S. PATENT DOCUMENTS

| | | | | |
|---|---|---|---|---|
| 8,292,482 | B2 * | 10/2012 | Harbers | F21K 9/20 362/652 |
| 8,956,922 | B2 | 2/2015 | Peil et al. | |
| 9,121,563 | B2 * | 9/2015 | Schug | F21S 41/675 |
| 9,614,348 | B2 | 4/2017 | Daniels et al. | |
| 10,107,472 | B2 * | 10/2018 | Vice, Jr. | F21V 5/04 |
| 10,948,157 | B2 * | 3/2021 | Huang | G02B 3/08 |
| 11,105,491 | B2 * | 8/2021 | Hendricks | F21S 10/02 |
| 2011/0182054 | A1 * | 7/2011 | Lee | H05K 1/0203 362/235 |
| 2012/0087116 | A1 * | 4/2012 | Tukker | F21V 7/041 362/231 |
| 2013/0155671 | A1 * | 6/2013 | Kurt | F21V 5/04 362/231 |
| 2013/0229799 | A1 * | 9/2013 | Lee | F21V 29/717 362/235 |
| 2014/0022780 | A1 * | 1/2014 | Roberge | F21V 29/74 362/231 |
| 2018/0286841 | A1 * | 10/2018 | Makanoeich | H05B 45/46 |
| 2019/0179072 | A1 | 6/2019 | Muschaweck | |

FOREIGN PATENT DOCUMENTS

| | | | |
|---|---|---|---|
| CN | 104949000 | A | 9/2015 |
| CN | 208062091 | U | 11/2018 |
| CN | 109642717 | A | 4/2019 |
| DE | 10-2016-224341 | A1 | 6/2018 |
| EP | 1 898 467 | A2 | 3/2008 |
| EP | 2280213 | A2 | 2/2011 |
| EP | 2614291 | A1 | 7/2013 |
| WO | 2009109387 | A1 | 9/2009 |
| WO | 2012032455 | A1 | 3/2012 |
| WO | 2018029234 | A1 | 2/2018 |
| WO | 2019040730 | A1 | 2/2019 |

OTHER PUBLICATIONS

CN Office Action dated Dec. 13, 2023 as received in Application No. 202080074134.1.

* cited by examiner (A)

(B)

(C)

SPOTLIGHT LED LIGHT SOURCE

TECHNICAL FIELD

The present invention relates to embodiments of a light source (a so-called light engine) for a spotlight for illuminating a film, studio, stage, event, and/or theater environment, and embodiments of a spotlight with such a light source.

BACKGROUND

Spotlights are normally used for illuminating a film, studio, stage, event, and/or theater environment. Sometimes, it is desirable for a spotlight comprising a light-generating assembly to provide an adequate luminous flux and to meet further requirements, such as are usual for a film, studio, stage, event, and/or theater environment. Such requirements include, for example, continuous operation over several hours, a wide adjustment range of a beam angle, a homogeneous and/or a soft-edged light field. These functions must also be reliably provided even under difficult environmental conditions and under heavy demands made on the spotlight.

Instead of well-known light sources, such as light bulbs or gas discharge lamps, light-generating assemblies with an LED arrangement are increasingly being used. Several LEDs can be arranged on a carrier, and the light produced by these LEDs can be optically further processed in order to provide a spotlight with particular properties.

It is usually desirable to build a very compact, color-adjustable light source. This sometimes requires LEDs to be arranged closely adjacent to one another. However, a high packing density can require a complex implementation of a current supply, since LEDs of different color types in different positions have to be supplied with different operating currents.

The high temperatures that may continue to be associated with the power dissipation can require the use of good heat-conducting substrates, but this can lead to restrictions relating to the design and installation of the current lines.

Packing density, cooling, and good color-mixing therefore sometimes work against one another.

In addition—particularly in the case of relatively compact light-generating assemblies—high demands are made on the geometric precision of the optics which further process the light emanating from the LEDs. Particularly in the case of so-called lens arrays, it is important that the individual lenses be positioned exactly above the respectively assigned LEDs, and that the individual lenses have very small shape and position tolerances, and that their internal structure and their surface be free of defects.

Due to the high temperatures in compact light-generating assemblies, it may also be necessary to manufacture the optics from glass rather than plastic. This requires complicated and comparatively expensive production, also because microstructures in glass can be manufactured only with major restrictions, such as, for example, with larger edge radii than in the case of plastic lenses. Below a certain minimum size of the structures, the production of a lens array made of glass is impossible even today.

Another disadvantage of lens arrays is that the focused light emitted by them cannot be used without further measures for, for example, generating a color-homogeneous light field at a distance of several meters by means of a Fresnel lens or projection lens. Instead, it is necessary for the light emerging from the lens array to be color-mixed first by means of a further optical assembly, such as a solid or hollow light guide, before it is further bundled, expanded, or otherwise shaped in a Fresnel lens or a projection lens. However, the light-mixing optical assembly in this case degrades efficiency and increases the installation space of the entire optics.

US 2012/0087116 A1 discloses a light source with features of the preamble of claim 1.

It is therefore an aim of the present invention to propose a universally usable light source (light engine).

DESCRIPTION

According to a first aspect, a light source for a spotlight for illuminating a film, studio, stage, event, and/or theater environment with the features of claim 1 is proposed.

Features of advantageous embodiments of the light source are specified in the dependent claims. The features mentioned therein, as well as the optional features listed below, can be combined to form further embodiments, unless expressly indicated otherwise.

A spotlight for illuminating a film, studio, stage, event, and/or theater environment forms a further aspect. The spotlight comprises a light source, according to the first aspect, for illuminating the film, studio, stage, event, and/or theater environment.

Further features are explained with reference to the drawings.

BRIEF DESCRIPTION OF THE DRAWINGS

The parts shown in the figures are not necessarily true to scale; the emphasis lies rather in presenting principles of the invention. In addition, the same reference numbers refer to mutually corresponding parts in the figures. Shown in the drawings are.

DETAILED DESCRIPTION

In the following detailed description, reference is made to the accompanying drawings, in which the illustration of specific embodiments shows how the invention can be implemented in practice.

In this context, directional terminology, such as “upper,” “lower,” “back,” “front,” “rear,” “downstream,” “upstream,” etc., can be used with respect to the orientation of the figures which are described. Furthermore, terms such as “in front,” “after,” or “behind” can denote the arrangement of components with respect to the direction of the light beams. “After the lens” means, for example, a region facing the light exit side of the lens. Since parts of embodiments may be positioned in a number of different orientations, directional terminology may be used for purposes of illustration and is by no means limiting. It should be noted that other embodiments may be used and structural or logical changes may be made without departing from the scope of protection of the present invention. The following detailed description is therefore not to be understood in a limiting sense, and the scope of protection of the present invention is defined by the appended claims.

Reference is now made in detail to various embodiments and to one or more examples illustrated in the figures. Each example is presented in an explanatory manner and is not to be construed as limiting the invention. For example, features illustrated or described as part of an embodiment can be applied to or be applied in connection with other embodiments in order to also produce yet another embodiment. It is intended that the present invention include such modifications and variations. The examples are described using a specific language that should not be construed as limiting the scope of protection of the appended claims. The drawings are not to scale and are for illustrative purposes only. For better understanding, unless otherwise stated, the same elements have been identified by the same reference numbers in the various drawings.

Figure 1:
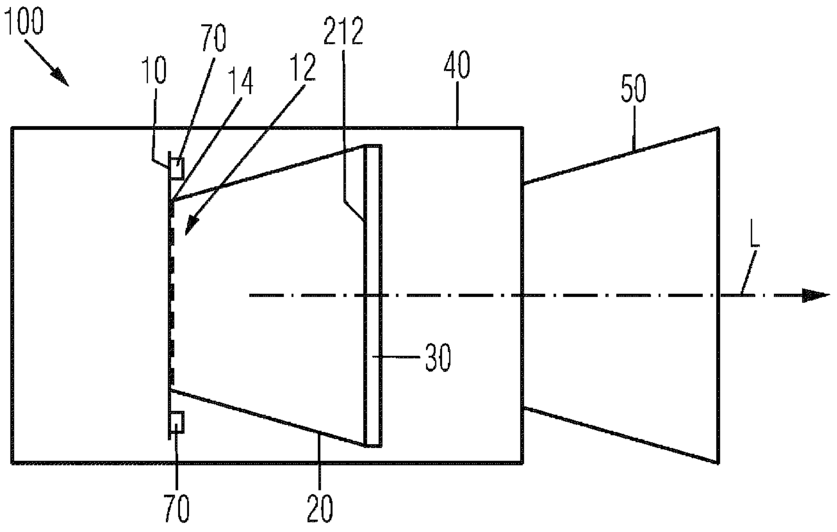
FIG. 1 schematically and by way of example, a spotlight with a light source according to one or more embodiments.

FIG. 1, schematically and by way of example, illustrates a spotlight 100 for illuminating a film, studio, stage, event, and/or theater environment. For this purpose, the spotlight 100 outputs light into the environment in the direction L. For generating the light, the spotlight 100 comprises a light source which has a carrier 10, a collector optical system 20, and an output optical system 30. The light source equipped in this way can also be referred to as a light engine. In the following, however, the light source is what is referred to in most cases. In addition to the light source, the spotlight 100 can comprise a number of further components typical of spotlights for illuminating a film, studio, stage, event, and/or theater environment, such as a housing 40, a barn door 50, a user interface, a controller, various control and power inputs, etc., and also further components for further processing the light provided by the light source on the basis of the carrier 10, the collector optical system 20, and the output optical system 30. However, these optional further components will not be discussed further here.

A focus of the present invention is the light source, which can essentially be composed of the components carrier 10, collector optical system 20, and output optical system 30 and can represent a universally usable light engine for a plurality of different spotlights. Furthermore, the light source has at least one component of a control device 70 for controlling a plurality of LEDs arranged on the carrier 10.

According to some embodiments, the components carrier 10, collector optical system 20, and output optical system 30 are joined together essentially without further light-generating or light-processing components, and thus form the LED-based light engine. For controlling the LEDs, the control device 70 is provided as part of this light engine.

In the following, properties of the components carrier 10, collector optical system 20, and output optical system 30, as well as of the control device 70, are referred to; here, reference is also made to FIGS. 2, 3 and also FIGS. 9A-C.

The carrier 10 is at least partially designed as a single-layer printed circuit board. In the present case, the term, single-layer carrier, is understood to mean a design of the carrier 10, according to which no crossing regions of lines are formed at least in part in the carrier substrate, i.e., within the carrier. For example, where the carrier 10 is of single-layer design, there is only a first piece of conductor track in the carrier or on the carrier, but no further piece of conductor track, which, with the first piece, forms a crossing region (vertically offset with respect to the first piece).

According to one embodiment, the entire carrier 10 is designed as a single-layer carrier. Crossing regions are, if necessary, formed with further components, such as wire bridges or zero-ohm resistors, outside the carrier, e.g., above and/or below the carrier 10, but not in the carrier 10. The carrier can thus be cost-effective and enable advantageous heat dissipation.

According to one embodiment (see FIGS. 9A-C), the carrier 10 is arranged on a support 90 of the light source. The support 90 can also form a part of the housing 40 of the spotlight 100. To fasten the carrier 10 onto the support 90, a coupling layer 80, which has an opening corresponding to the LEDs 12 (described in more detail below), can be used, e.g., a pressure plate. According to one embodiment of the light source, the coupling layer 80 has a (e.g., lensless) opening 83, through which the light coming from the LEDs 12 passes. The coupling layer 80 is formed in one piece, as, for example, illustrated in FIGS. 9A-B, or in two pieces, as illustrated in FIG. 9C.

Figure 9A:
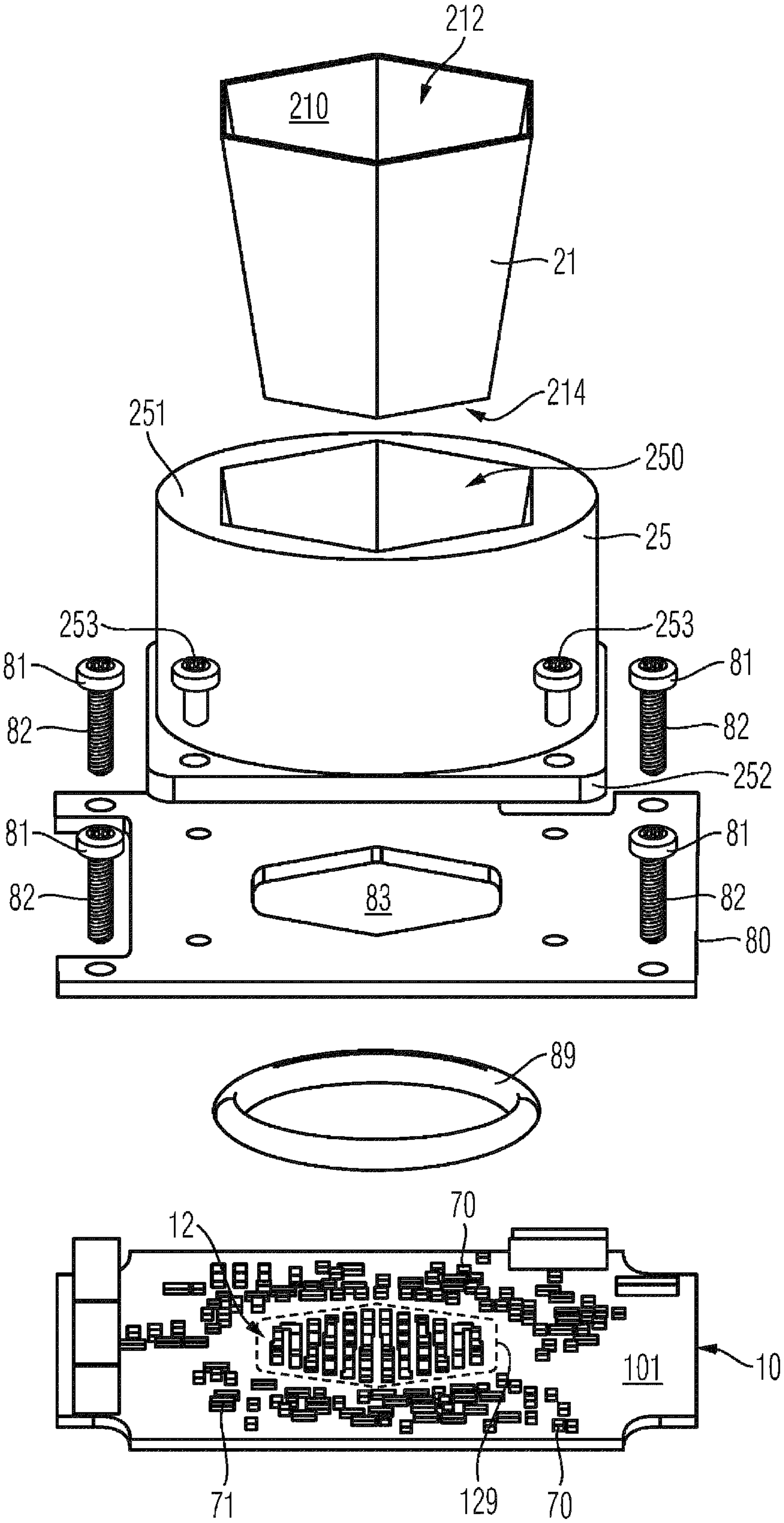
FIGS. 9A-C schematic and exemplary details of two exploded views and one perspectival view of a light source according to some embodiments.
Figure 9B:
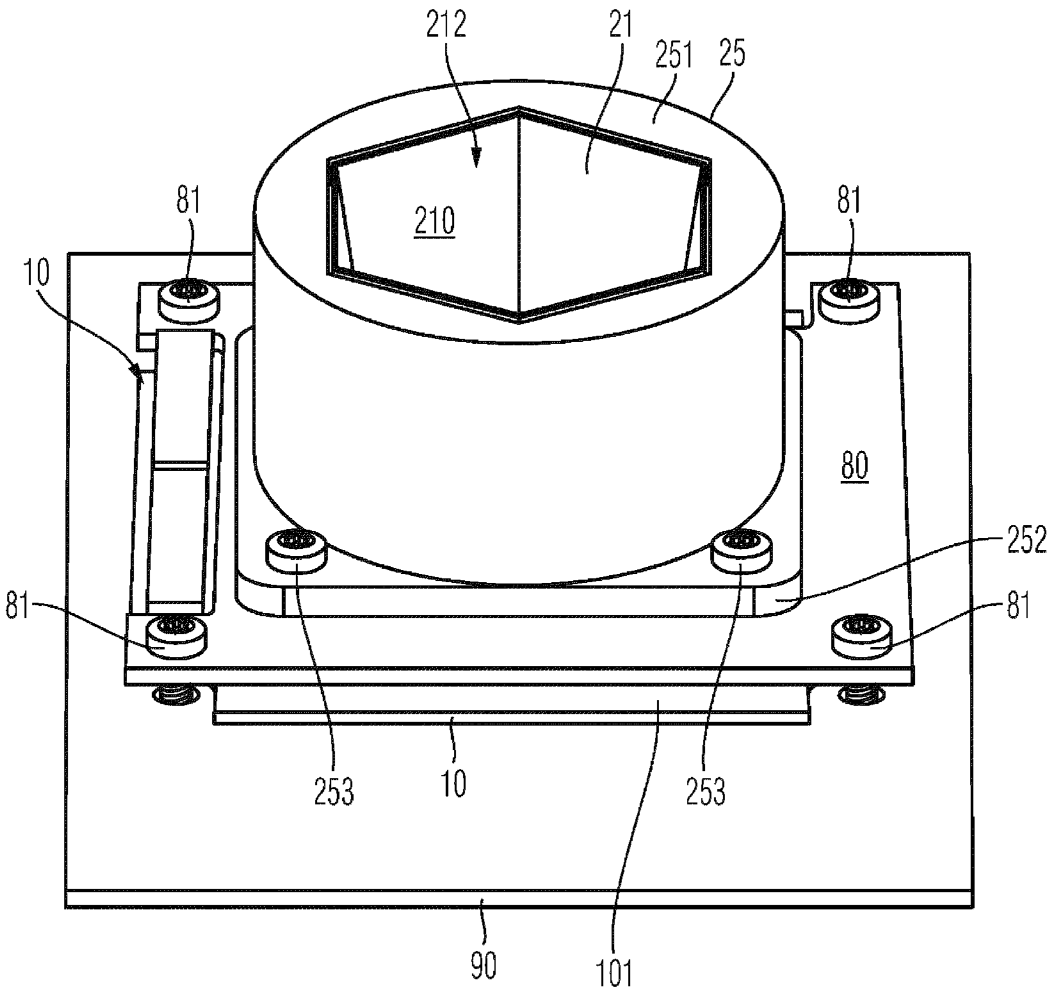

The carrier 10 is fastened to the support 90, for example, by means of screws 81 which—for example, via springs 82—engage in corresponding receptacles 91 of the support 90 (see FIGS. 9A-B). To protect the front face 101 of the carrier 10, an elastic intermediate layer 89 (e.g., an O-ring) can be provided between the front face 101 of the carrier 10 and the rear face of the single- or multi-part coupling layer 80, which also has an opening corresponding to the envelope 129 surrounding all the LEDs 12. The intermediate layer 89 engages, for example, in an unpopulated area of the carrier front face 101—for example, adjacent to the envelope 129 (see FIG. 9A). A rear face, opposite the front face 101, of the carrier 10 thus rests on the support 90. According to one embodiment of the light source, the support 90 forms a heat sink.

A plurality of LEDs 12 with N>2 different color types are located on the carrier 10—for example, on the front face 101 thereof. In order to supply the LEDs 12, a current line system 14 with a plurality of lines with N line types is arranged on the carrier 10 (where this formulation is also understood to mean that lines can be at least partially integrated into the carrier and/or lines be mounted on the carrier—for example, its front face 101).

To control the LEDs 12, a control device 70 is provided, e.g., one which controls the LEDs as a function of a user input. The user input relates, for example, to at least one of the following setting options: a brightness setting, a color temperature, a color, the selection and/or parametrization of a light effect, a setting with respect to a master-slave configuration, etc. The user input can be received by the control device by wire and/or wirelessly. For the reception of the user input, the control device 70 has, for example, its own user interface (e.g., comprising a display and input and selection means). Alternatively or additionally, the control device 70 can be coupled to the controller of the spotlight 100 and, via this, receive the user input.

The control device 70 may comprise a plurality of distributed components (see also FIGS. 9A, 9C), at least one of which is arranged on the carrier 10. These components include, for example:

- a user interface via which a user can input user inputs relating to one of the following setting options: a brightness setting, a color temperature, a color, the selection and/or parametrization of a light effect, a setting with respect to a master-slave configuration, etc.;

- a data memory which retrievably stores, for example, LED-specific setting data (such as, for example, LED-specific calibration data) and/or input user data;
- a sensor system, e.g., a temperature sensor system and/or color measurement sensor system, which detects one or more current operating parameters of the LEDs 12 and provides corresponding measurement data to the logic circuit;
- a logic circuit or a controller which, for example, provides control data for the LEDs 12 on the basis of the LED-specific setting data and/or on the basis of the current user input or stored user data, and/or on the basis of the measurement data;
- a power electronics unit, such as a power supply unit and/or an LED driver circuit, which, for example on the basis of the control data, places supply currents by means of the current line system 14 for the LEDs 12;
- further typical control components used for controlling LEDs of a light source of a spotlight.

At least one component, e.g., at least one of the aforementioned components, of the control device 70 forms a part of the light source. The at least one component of the control device 70 is arranged, for example, on the carrier 10.

The aforementioned components can include subcomponents. The control device 70 can thus be formed from a system of spatially-distributed components and subcomponents. According to one variant, an LED driver circuit board is, for example, provided which is arranged in the vicinity of the carrier 10 and is coupled, via corresponding lines, to the LEDs 12 in terms of control technology and power technology.

According to one embodiment, the control device 70 is arranged at least partially on the carrier 10. For example, a data memory 71 (see FIG. 9A) for storing setting data specifically relevant to the LEDs 12, such as parameters and/or LED-specific calibration data, is located on the carrier 10. The data memory 71 on the carrier 10 is, for example, an EEPROM (electrically-erasable, programmable, read-only memory). Alternatively or additionally, one or more temperature sensors are arranged on the carrier 10 in order to determine the current temperature of one or more of the LEDs 12. These temperature sensors can be designed, for example, as NTC resistors, the voltage of which is captured by the LED driver circuit board (or by a corresponding component on the driver circuit board) as a measure of the respective temperature.

A lensless collector optical system 20 collects and mixes the light emanating from the LEDs 12. For this purpose, the collector optical system 20 can surround all of the LEDs 12 and collect and mix the light emanating from each of the LEDs 12, as will be explained in more detail further below. The collector optical system 20 is located where it can collect the light of the LEDs 12. The collector optical system 20 can be mounted either on the carrier 10, e.g., by screwing or gluing to or onto the carrier 10, or at any other point, such as, for example, on the housing 40 of the spotlight 100. According to one embodiment, the collector optical system 20 is coupled to the carrier 10.

An output optical system 30 closes off the light source; it terminates the light source. The output optical system 30 transmits light from the collector optical system 20 and outputs it, e.g., with a defined scattering characteristic, into the environment. The output optical system can be a cover plate—for example, in the form of a light-shaping or light-scattering element.

It is clear that, when the spotlight 100 is formed with the light source of the output optical system 30, (optical) components can be provided downstream, e.g., a secondary optical system, which can further shape, bundle, and/or align the light output by the output optical system 30 or otherwise process it, such as the barn door 50, for example, before the light enters the further environment that is ultimately to be illuminated. This aspect is explained in more detail with reference to FIG. 10.

In particular, in one embodiment, a light and/or color sensor is provided on the carrier or on the collector optical system 20, on the output optical system 30, on the secondary optical system, or at another location at which the light and/or color sensor can receive the light emitted by the light source directly or by means of a light guide. Corresponding output data of the light and/or color sensor are then supplied, for example, to the control device 70, e.g., to a memory of the control device 70, so that these output data can be retrieved from the logic circuit or controller control device 70 and be taken into account in the control of the LEDs 12.

Further optional features of the light source with the carrier 10, the lensless collector optical system 20, the output optical system 30, and the control device 70 will be discussed below, wherein reference is made to FIGS. 1, 2, 3, and 9A-C.

The carrier 10 is, for example, a ceramic carrier—for example, a ceramic circuit board. The carrier 10 then consists, for example, predominantly of a ceramic. If the carrier 10 is designed as a circuit board, the lines will take the form of conductor tracks which supply the LEDs 12 with current. These conductor tracks can be applied to the carrier 10 (e.g., laminated, glued, and/or deposited on the carrier 10 by means of a physical or chemical process) and/or integrated into the carrier 10.

The carrier 10 can also be designed as an IMS (integrated metal substrate) circuit board. In this variant of the carrier 10, the circuit board is, for example, a metal sheet, on the upper and/or lower face of which a very thin dielectric is fastened—for example, a plastic film or a ceramic layer. The material combination is aluminum with aluminum oxide, for example. The conductor tracks are in turn applied by vapor deposition or otherwise attached to the thin dielectric. For example, in this embodiment of the carrier 10, a ceramic layer surrounds a metallic core—for example, made of aluminum. IMS circuit boards have an advantageous thermal conductivity.

According to one embodiment, the carrier 10 is designed as an at least partially, and preferably completely, single-layer ceramic circuit board (with or without a metallic core), in which lines of the current line system 14 are implemented as conductor tracks laminated onto the carrier 10, and, at the crossing regions, at all events are formed outside (for example, above and/or below) the carrier 10, but not in the interior of the carrier 10 or in a layer on the carrier 10.

In another embodiment, the carrier 10 can be formed from an epoxy resin fabric; for example, the carrier 10 can be a conventional FR-4 circuit board.

The plurality of LEDs 12 are arranged on the carrier 10—for example, on its front face 101. In addition, one or more components of the control device 70 (see FIG. 2) can be provided on the carrier 10, e.g., those which provide the current to supply the LEDs 12 or which are involved in providing the current. Such components are, for example, power-electronic converters, controllers, sensors, and the like, as explained above.

The LEDs 12 can each be designed as a single LED—for example, as a lensless (or lens-free) single LED. Apart from the optical components that are strictly necessary for generating and emitting light, the LEDs 12 have no further optical components which serve merely to shape or otherwise manipulate the emitted light. Such lens-free LEDs are available in comparatively simple design and inexpensively available on the market. In addition, they have compact dimensions. In another variant, the LEDs 12 are arranged in LED clusters, wherein the LED clusters can each be designed to be lensless or lens-free.

In principle, however, all types of LEDs can be used, depending upon which emission characteristic of the light source is desired. However, a prerequisite is that the light originating from the LEDs 12 can also be received by the collector optical system 20 so that the collector optical system 20 can carry out the light mixing. Not considered are thus those LEDs which emit light only to the front, e.g., in the manner of a light beam running perpendicular to the front face 101, so that it can no longer be mixed by the collector optical system 20.

A respective soldering surface or an underside (so-called "footprint side") of the LEDs 12 in each case faces in the direction of the front face 101 of the carrier 10, and the light exit side of the LEDs 12 in each case faces in the direction L, i.e., perpendicular to the front face 101. The plurality of LEDs 12 are, for example, greater than 20, than 50, or greater than 100.

The number of different color types is at least 2. However, more than two color types can also be provided—for example, three color types, or four color types (for example, red, green, blue, and white).

All LEDs 12 can be of the same size. The packing density is, for example, greater than LEDs per square centimeter.

One possibility for arranging the LEDs 12 on the carrier 10 is described, for example, in DE 10 2016 224341 A1.

The current line system 14 (not shown in FIGS. 1, 2, 3, and 9) comprises a conductor type for each color type, for example. The different conductor types can be insulated from one another and carry different currents or different electrical potentials.

By means of the N conductor types, the LEDs 12 of the N color types can be connected by color type individually or in any desired combinations. The light source can thus provide light corresponding to the N color types and the combinations thereof. In the event that a combination is connected, the light emitted by the light source is in addition mixed due to the collector optical system 20.

With regard to FIGS. 5-8B, different possibilities for the arrangement of the current line system 14 on the carrier 10 shall be presented.

Firstly, the lines 141 to 144 can each be designed as conductor tracks which are applied (or fastened) to the carrier 10 and/or are integrated into the carrier 10. Bridges 146 can be provided below/above the carrier 10 to form any crossing regions 145 there may be.

Alternatively, the crossing regions can be formed in the carrier 10. According to some exemplary embodiments, the current line system 14 also includes connection tracks 149 which can be connected to corresponding contact sections 128 of the LEDs in order to connect the LEDs 12 to the current line system 14.

Figure 8B:
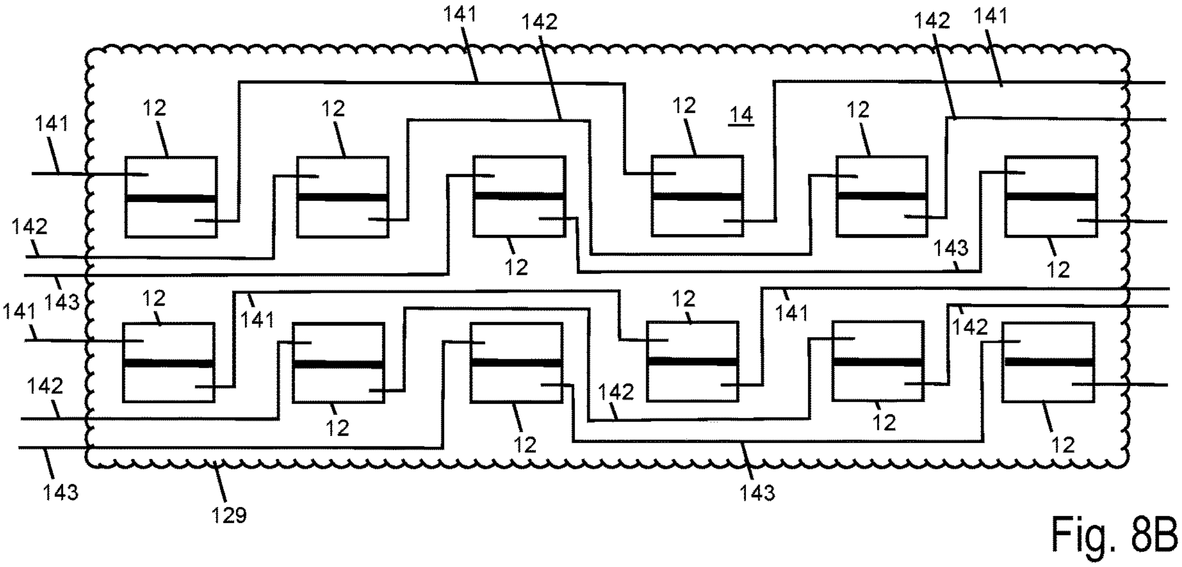

According to one variant, it is provided that the lines 141-144 (for example, taking the form of conductor tracks) or other parts of the current line system 14 not intersect in a vertical projection of an envelope of the LEDs 12 (i.e., the projection of the surface defined by the envelope 129). As one such example, FIG. 8B illustrates an embodiment in which the lines 141-143 do not intersect in a vertical projection of the envelope 129 of the LEDs 12. Referring, as another example, to FIG. 9, this means that below and above a projection of the envelope 129, which surrounds all of the LEDs 12 (approximately corresponding to the circumferential profile of the collector optical system 20 at the interface between the collector optical system and the carrier 10), no crossing regions are formed at all, not even in the carrier 10. In this region, which corresponds to the vertical projection of the envelope, the carrier 10 can thus be formed in one layer and have correspondingly advantageous heat dissipation properties.

However, such a specification with regard to the crossing regions somewhat limits the packing density and the arrangement possibilities of LEDs of different types (and thus the color mixing).

According to another variant, the current line system 14 is designed such that the lines 141, 142 or other parts of the current line system 14 do not cross a vertical projection of any one of the LEDs 12. This variant is shown, for example, in FIGS. 5-8A, which illustrate that there are no crossing regions which overlap one of the vertical projections of the LEDs 12, but that crossing regions are formed only in such regions (e.g., in the carrier 10 or above/below the carrier 10) which do not form an overlap with vertical projections of the LEDs 12.

If the crossing regions are formed in the carrier 10, the carrier will be formed there in multiple layers only in the crossing regions, but not in regions that overlap a vertical projection of each of the LEDs 12.

Another alternative to the arrangement of the current line system 14 would be allowing crossing regions at any locations in the carrier, below the carrier 10 and/or above the carrier 10, which, however, can be problematic with regard to the heat dissipation if many crossing regions are formed—in particular, if they lie within a projection of the envelope 129. Outside of the envelope 129, the formation of crossing regions tends to be unproblematic, and therefore even customary.

Further details of exemplary arrangements of the current line system 14 will now be explained with reference to FIGS. 5-8B.

In the embodiments according to FIGS. 5 through 8A, lines 141-144 (or components of the current line system 14 connected thereto) cross different conductor types in crossing regions 145, wherein only some of the crossing regions 145 are provided with a reference sign. In this case, in a vertical plan view, the crossing regions 145 lie on the carrier front face 101 and outside the vertical projections of the LEDs 12. In other words, no crossing regions 145 are formed below or above the LEDs.

In addition, the crossing lines 141-144 (or components of the current line system 14 connected thereto) run in a direction perpendicular to the carrier front face 101, one above the other or one below the other. They are electrically insulated from one another.

The crossing lines 141-144 in the respective crossing region 145 can both be integrated into the carrier 10 or applied to the carrier 10 and connected thereto. The carrier 10 then has a multilayer design in the crossing regions 145.

Alternatively, the carrier 10 can be completely single-layered, and one (or more) of the crossing line sections can take the form of a bridge 146 (e.g., above and below the carrier 10). For example, the carrier 10 is designed as a single-layer circuit board, at least in the region of the envelope 129 surrounding all of the LEDs 12, and bridges 146 are used to form the crossing regions 145 (instead of multi-layer sub-sections in or on the carrier 10).

The bridges 146 used to form the crossing regions 145 can be so-called microwire bridges, or so-called zero-ohm resistors, or be designed as bond bridges.

Figure 8A:
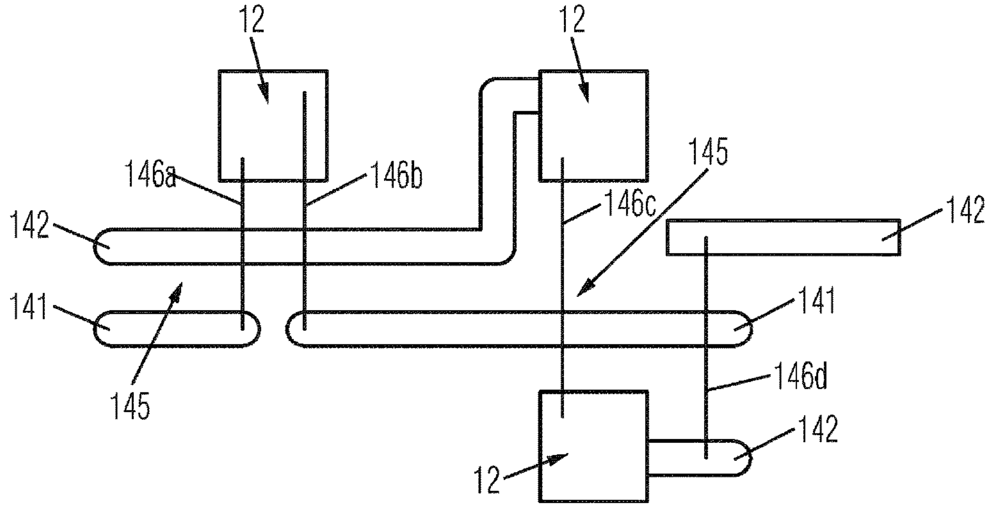

Exemplary embodiments of bridges 146 are shown in FIG. 8A. The bridges 146*a* through 146*d* shown in this figure can be used in any combination. For example, the lines 141-142 connect the LEDs 12 of the same type in series with one another. To form the crossing regions 145 outside the vertical projection surfaces of the LEDs, the bridges 146*a*-*d* are provided which connect the different LED types 12 to the respective lines 141-142. The bridges 146*a*-*b* include, for example, one of the LEDs 12 in series with a first line 141 forming a main conductor track. In this case, they bridge a second line 142 forming a different main conductor track. Two LEDs 12 of a different type are connected in series by the bridge 146*c* bridging the first line 141. A further bridge 146*d* likewise bridges the first line 141 and thus connects mutually offset subsections of the second line 142.

If bridges 146 are provided in the form of bonding wires, it is expedient to provide the carrier 10 with a so-called ENEPIG (electroless nickel electroless palladium immersion gold) coating.

Figure 5:
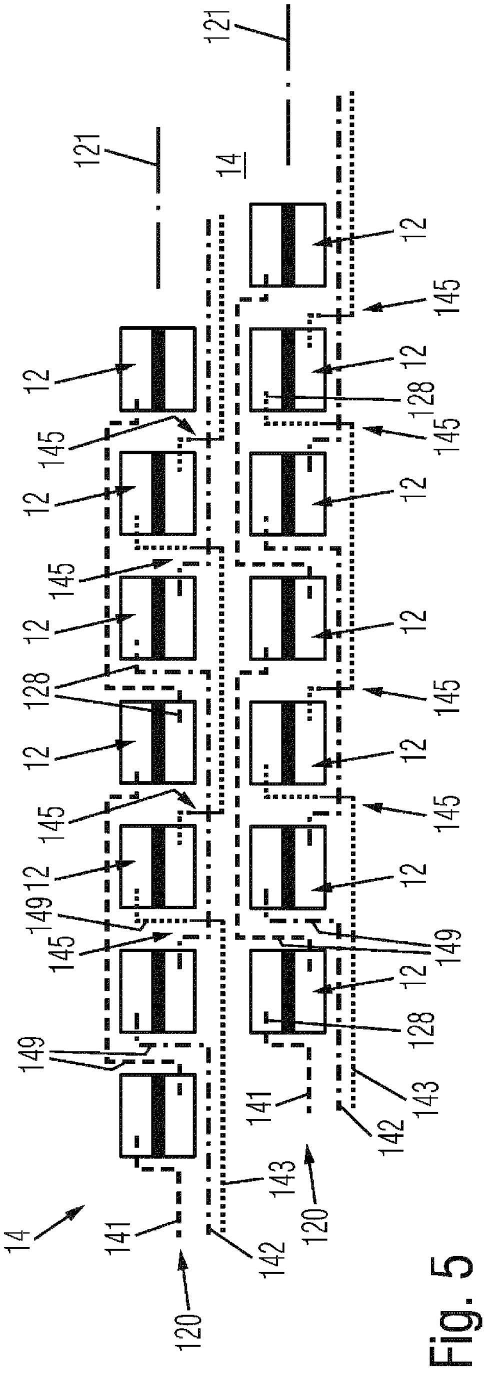
FIGS. 5-8B schematically and by way of example, aspects of a current line system of a light source according to one or more embodiments.
Figure 6:
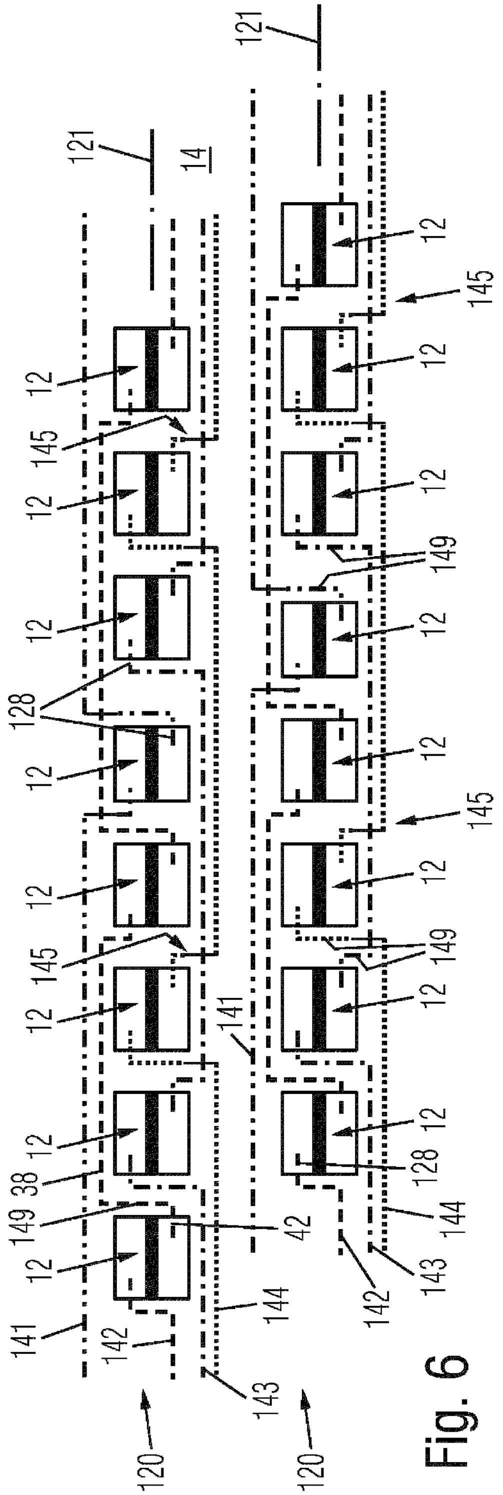
Figure 7:
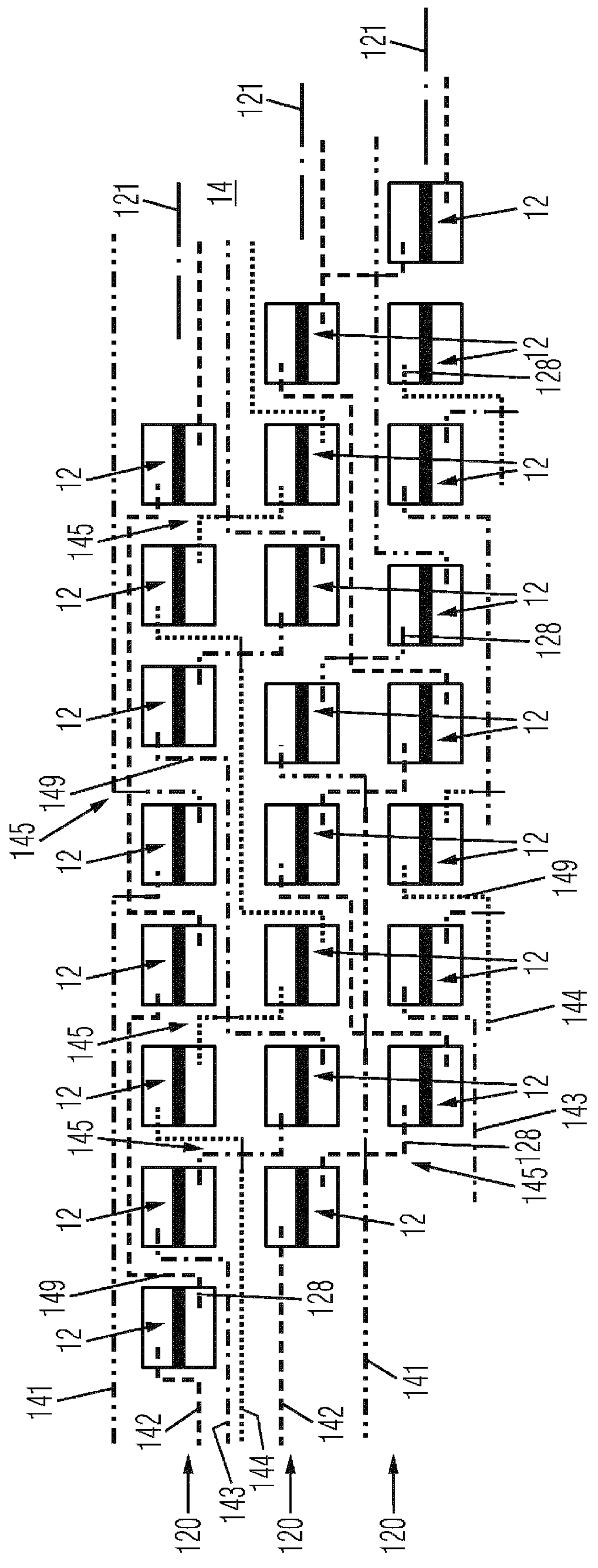

As illustrated by way of example in FIGS. 5 through 7 for one embodiment, all LEDs 12 are arranged according to a regular grid pattern on the carrier front face 101. For this purpose, a plurality of grid tracks 120 which are arranged without mutually overlapping and at a transverse distance are provided. Each grid track 120 comprises a plurality of grid placement locations on which one of the LEDs 12 can be positioned. The grid placement locations are arranged individually one after the other along a path 121 from a grid path entrance to a grid path exit.

However, the arrangement of the LEDs 12 according to a regular grid on the carrier front face 101 is not mandatory, and, under certain circumstances, also not advantageous. The optional omission of a lens array for the LEDs or the use of the lensless collector optical system does not require an arrangement of the LEDs according to a regular grid on the carrier front face 101. Instead, according to another embodiment, the LEDs 12 can also be arranged irregularly on the carrier front face 101—for example, optimized with respect to a high packing density and/or good color mixing.

In the illustrated embodiments, all grid placement locations provided on the carrier front face 101 are occupied by LEDs 12.

In each of at least 90% of all grid tracks 120, according to one embodiment, at least one LED 12 of each of the N different types of color is provided. In this case, the LEDs 12 of the different color types are positioned in any sequence. N is, for example, four.

The value of at least 90% means that at least one LED 12 of each of the N different types of color is provided in practically every grid path 120. Excluded therefrom are, for example, grid tracks 120 which run on the edge or comprise only a few grid placement locations due to geometric restrictions.

Running along the path 121 of the grid tracks 120, the line system 14 comprises main conductor tracks, which are formed by the lines 141-144, which are free of overlapping not only with one another, but also with the grid tracks 120. The main conductor tracks run without crossing one another. The main conductor tracks are, for example, conductor tracks that are fastened to the carrier front face 101 and do not intersect within the area defined by the envelope surrounding all of the LEDs 12.

For supplying current, each of the LEDs 12 is, in a direction transverse to the path 121, electrically connected by means of two connection tracks 149 to the main conductor track associated with the color type. The connection tracks 149 form part of the current line system 14.

The connection tracks 149 in turn are in each case electrically connected to a contact section 128 of the associated LED 12. The contact sections 128 extend, for example, along the path 121.

Each of the crossing regions 145 can be formed by a connection track 149 and a main conductor track, which are each assigned different color types. In this case, the main conductor track forming the crossing region 145 is always arranged adjacent to a main conductor track to which the connection track 149 forming the crossing region 145 is electrically connected.

As regards the distances between the grid tracks 120 in a direction transverse to the path 121, according to one variant, at most N main conductor tracks are located between two adjacent grid tracks 120, wherein the main conductor tracks formed by the lines 141-144 are each assigned different color types.

This is the case, for example, in the embodiments according to FIGS. 5 and 6, in which three or four main conductor tracks run between adjacent grid paths 120.

Alternatively, the current line system 14 can comprise main conductor tracks, wherein at most 0.5×N main conductor tracks are present between adjacent grid paths 120. In this case, 0.5×N is rounded up to the next higher whole number. The main conductor tracks which are adjacent on both sides in a direction transverse to the imaginary path 121 of a grid track 120 are each assigned different color types. This is shown in the exemplary embodiment according to FIG. 7. N=4 different color types are provided there, but only two main conductor tracks are present between adjacent grid paths 120.

As far as the distance between the grid placement locations adjacent along the path 121, i.e., the LEDs 12, is concerned, in all exemplary embodiments, there run between these at most two connection tracks 149, wherein the connection tracks 149 are each assigned to those color types which correspond to the LEDs 12 adjoining along the path 121.

The variants of the arrangement of the current line system 14 shown with reference to FIGS. 5-8B are merely examples. Further, and even alternative, embodiments are possible. One variant is the irregular arrangement of the LEDs 12 on the carrier front face 101.

In summary, there are three possibilities for designing the current line system 14 and the carrier 10 with regard to the crossing regions 145:

According to the first possibility, the lines 141-144 or other components of the current line system 14 do not intersect in a vertical projection of the envelope of the LEDs 12 (i.e., in a vertical projection of the area defined by this envelope), as illustrated in FIG. 8B. In this region of the vertical projection, no crossing regions are formed either in the carrier 10 or above or below the carrier 10. In the region of the area defined by the envelope, the carrier 10 is then designed, for example, as a single-layer circuit board. Even above or below the carrier 10, there are no crossing regions 145 in the area corresponding to the envelope.

However, the prohibition against forming crossing regions 145 in the said region naturally has implications with regard to the possible arrangement of the different LEDs 12. In particular, if many color types are provided, many conductor tracks would have to be accommodated between the LEDs 12 in order to avoid the formation of crossing regions. Thus, although very good heat conduction could be achieved, certain challenges are presented with regard to achieving a high packing density and advantageous color mixing. As already mentioned, document DE 10 2016 224 341 A1 teaches in this regard some approaches to the arrangement of the LEDs 12.

The second possibility is allowing crossing regions only in those regions which do not form an overlap with the vertical projections of the LEDs 12. Variants for designing this possibility are illustrated in FIGS. 5-8A. The crossing regions 145 can then be formed in the carrier 10, above and/or below the carrier 10. The variant is expedient according to which no crossing regions are formed in or on (e.g., crossing regions laminated onto) the carrier. Then, according to the second possibility of the carrier 10 in the region of the envelope surrounding the LEDs 12, it can also be designed as a single-layer circuit board, with integrated/laminated conductor tracks which do not intersect. The crossing regions 145 are then formed offset to the LEDs 12, e.g., above the carrier 10, as explained, using corresponding bridges 146. Alternatively or additionally, the crossing regions 145 are formed in the carrier 10. In this variant, the carrier 10 is, for example, partially multi-layered (in regions corresponding to the crossing regions 145) and partially formed in one layer (in regions corresponding to the vertical projections of the LEDs 12).

The third possibility does not impose any conditions with regard to the number and location of the crossing regions.

At this point, it should be mentioned that the terms used here of single-layeredness or multi-layeredness relate to the formation of the carrier 10 with respect to the current line system 14, which is implemented on and/or in the carrier 10. In one embodiment, the carrier 10 is therefore of single-layer design below the LEDs 12, and, between the LEDs, is either multi-layered or single-layered. The crossing regions 145 can be formed between the LEDs, e.g., using the microwire bridges (see bridges 146), which can be set, for example, by bonding. In this variant, the carrier is provided, for example, with a so-called ENEPIG (electroless nickel electroless palladium immersion gold) coating, as explained at the outset.

It should be pointed out here that the crossing regions 145 formed outside the carrier 10 can be surrounded by a potting compound—for example, a resin.

As discussed above, according to one embodiment, the current line system 14 is coupled to the control device 70, e.g., to a plurality of current output terminals of a power electronics component of the control device 70. For example, an LED driver board, which is connected via lines to the current line system 14 of the carrier 10, is provided as the power electronics component below the carrier 10. Likewise, for example, sensors on the carrier 10 can deliver their measurement values (for example, a voltage at an NTC resistor) to the LED driver circuit board via corresponding sensor lines.

According to one embodiment, an active cooling system, such as a water cooling system, is mounted on the carrier 10.

In one embodiment of the light source, the heat loss produced by the LEDs 12 is cooled solely by the ambient air. A corresponding fan can be provided for these purposes. According to another embodiment, the cooling takes place completely passively, without additional active cooling components, such as fans, water cooling systems, or the like.

Cooling components, of which one or more can according to one embodiment be provided in the light source, include, for example: cooling ribs, a so-called vapor chamber below the carrier 10, heat pipes which, for example, dissipate heat in a direction opposite the light exit direction L, a fan, a liquid cooling system (for example, water cooling), etc.

According to one embodiment, the area of the light exit end 212 is at least 80% of the area of the light entry end 214.

Figure 2:
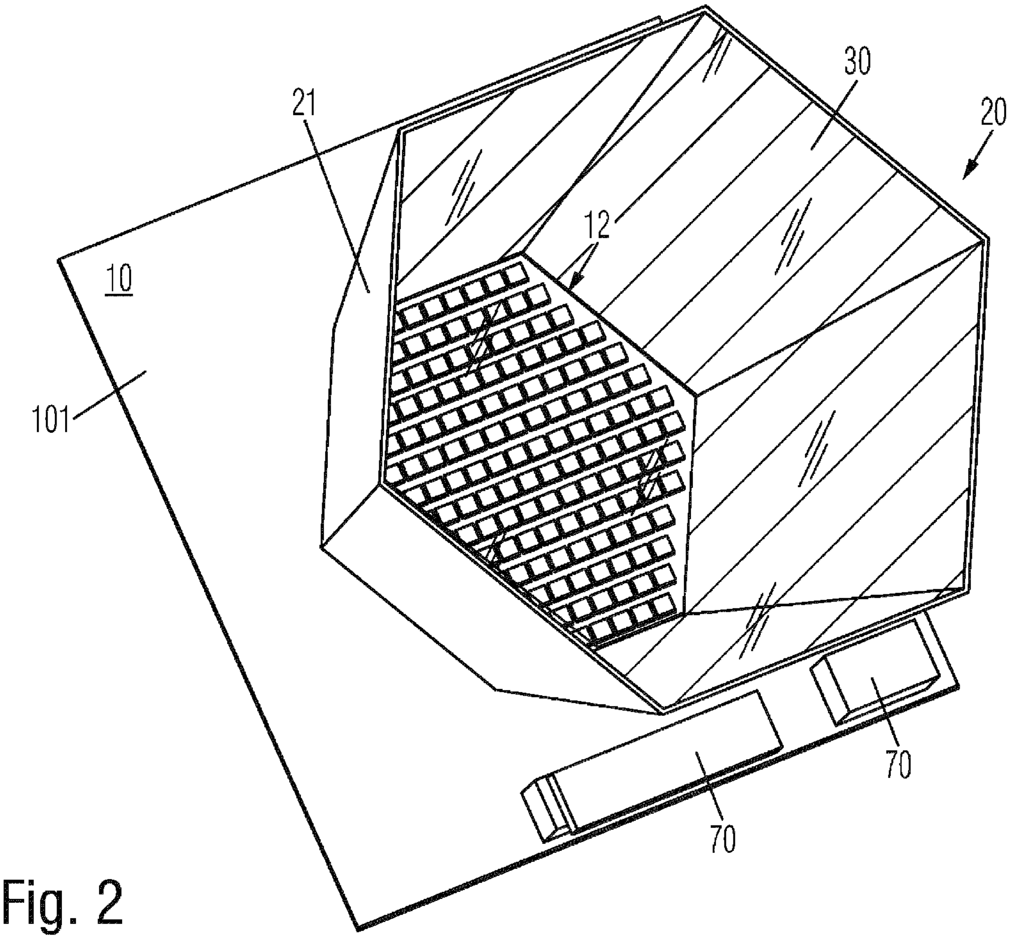
FIGS. 2 and 3 schematically and by way of example, a light source according to one or more embodiments.
Figure 3:
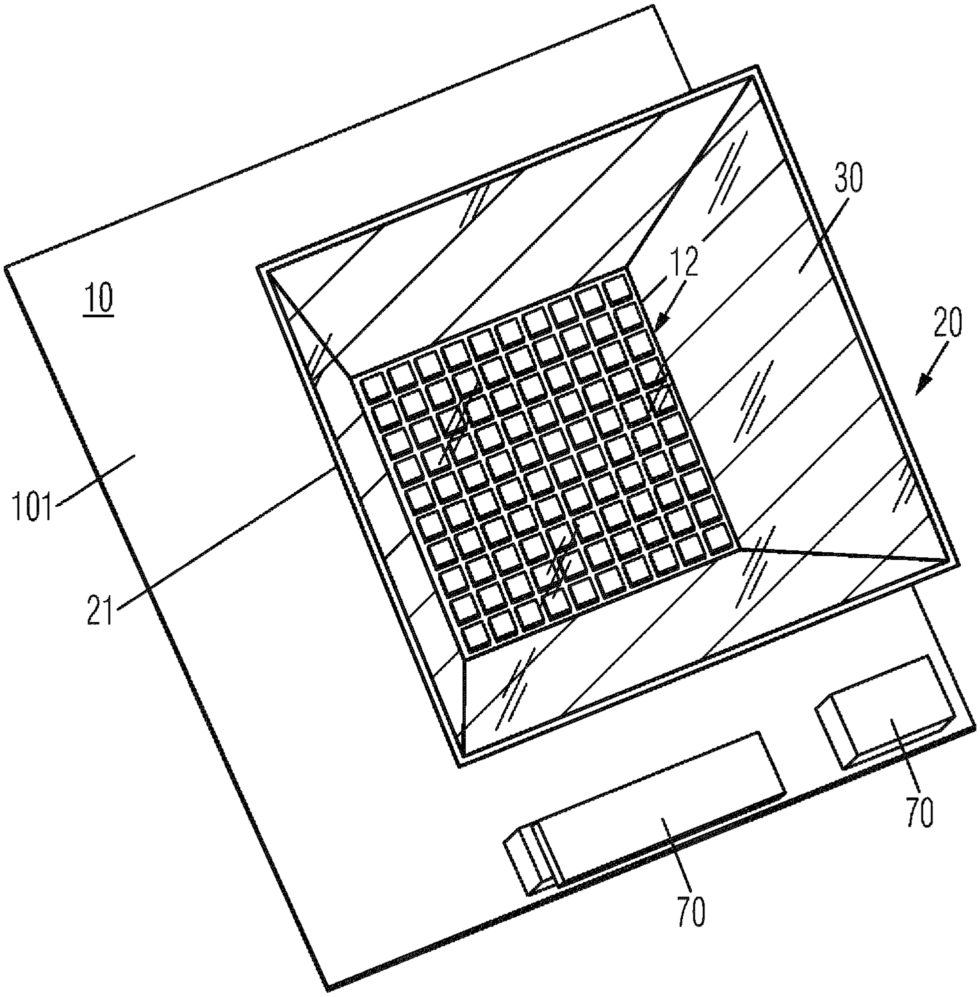

The internally mirror-coated reflector 21 is designed, for example, with a polygonal cross-sectional area increasing in size in the light exit direction L, e.g., in the manner of a truncated pyramid with six edges (see FIGS. 2 and 9, i.e., with a hexagonal cross-sectional area increasing in magnitude ("hexagon") perpendicular to the light exit direction) or four edges (see FIG. 3) or eight edges. The increasing cross-sectional area ensures that the light is bundled and not scattered.

The internally mirror-coated reflector 21 forms, for example, a collimation reflector.

The reflector 21 can have the most varied forms; advantageous here is, for example:

- a specific, defined reflectivity that is to be trackably produced,
- a selectable specular or diffuse reflection characteristic,
- a diameter increasing towards the light exit end 212 (for example, so that the light beams are bundled and not scattered), and/or
- a polygonal cross-section, so that the light beams are reflected back and forth, and thus mixed in color.

The internally mirror-coated reflector 21 is formed, for example, from a mirror-coated sheet metal winding. This corresponds to a cost-effective production method. For example, a MIRO sheet from the Alanod company is a possibility. According to one embodiment, a reflector 21 cut to form a strip of a certain shape and folded into, for example, a hexagonal truncated pyramid is used.

As already mentioned, the collector optical system 20 is lensless. Thus, according to one embodiment, it is provided that neither individual lenses for the LEDs 12 nor an individual lens array be provided between the output optical system 30 and the LEDs 12. The collector optical system 20 can form a primary optical system of the light source and does not comprise a lens arrangement with at least one lens that would span the entirety of the LEDs 26.

For example, the light source therefore is thus lens-array-free. This means that the light source has no lens array. Since a lens array for an LED arrangement comprises a plurality of individual lenses (for example, exactly one for each LED) which must be very small in the sense of a compact light source, the smallest dimensions of the lenses of such a lens array that can still be produced will limit the overall size of the light source in the direction of a more compact structure. This is done, on the one hand, for technical reasons, since lenses with the desired optical properties can no longer be produced below a certain minimum size. On the other hand, the limitation also arises from an economic viewpoint, since smaller lens arrays may incur higher production costs—for example, because the lenses need to be reworked in a complicated manner. By omitting the lens array, degrees of freedom in the design of the light source are thus opened up; in particular, it becomes possible to give the light source or parts thereof a particularly compact design.

Figure 4:
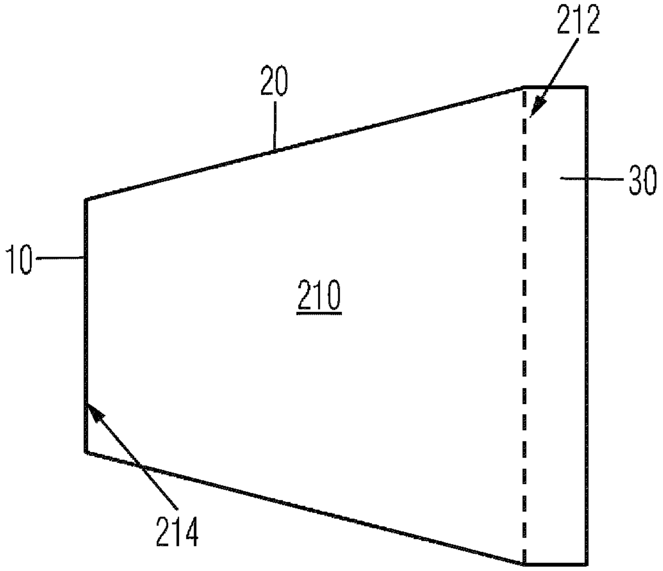
FIG. 4 schematically and by way of example, an output optical system of a light source according to several embodiments.
Figure 4:
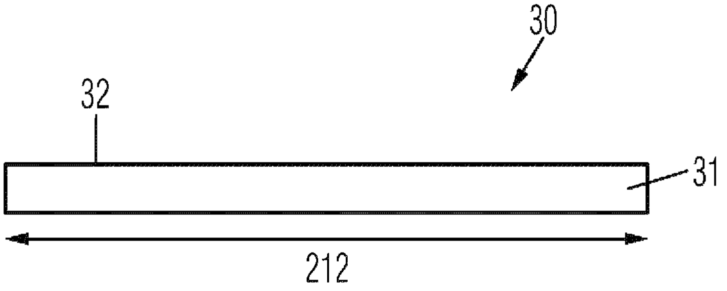
Figure 4:
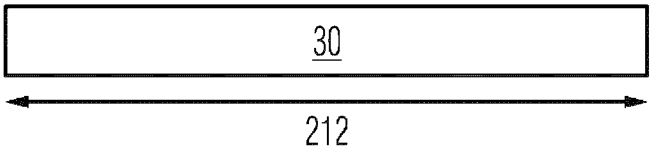
Figure 9C:
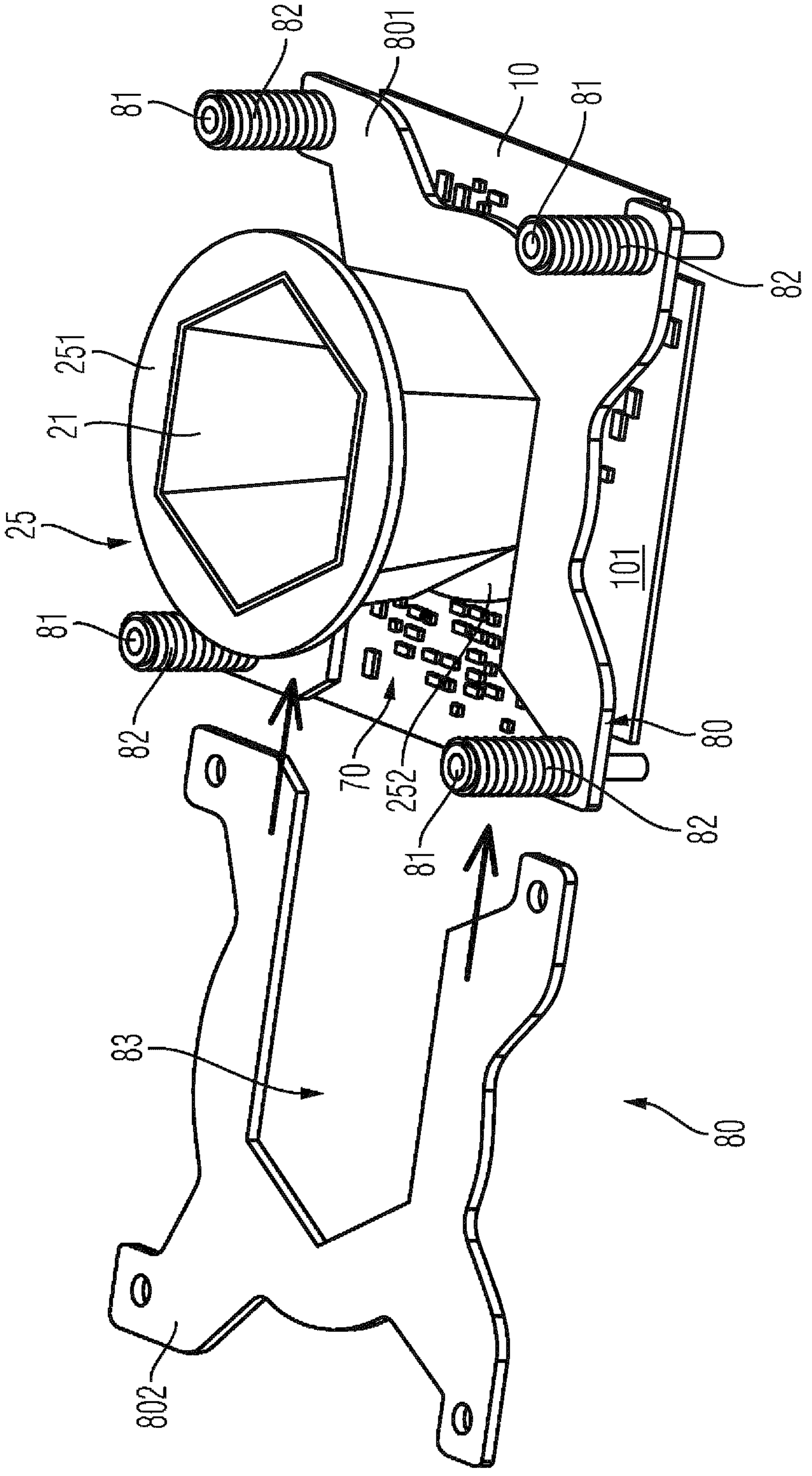

According to one embodiment of the light source, the collector optical system 20, e.g., the reflector 21, is embedded in a holder 25 (see FIGS. 9A-C). In this way, the collector optical system can be protected from external forces. The holder 25 has, for example, a receptacle 250 in which the collector optical system 20, e.g., the reflector 21, is completely embedded. For fastening the collector optical system 20, this can be provided—for example, on its outer side—with an adhesive which forms the connection to the receptacle 250. A front face 251 of the holder 25 forms, for example, a support surface for the output optical system 30, e.g., a diffuser disk, as schematically illustrated in FIG. 4(A).

A rear face 252 of the holder 25 is designed, for example, in the manner of a flange, and can be fastened to the coupling layer 80 by means of screws 253 (or other fastening means) according to the variant illustrated in FIGS. 9A-B. The rear face 252 of the holder 25, the coupling layer 80, the support 89, as well as the intermediate layer 89 and the support 90 can, for example, as illustrated in FIG. 9A-B, be coupled to one another in a type of sandwich construction.

Another variant is illustrated in FIG. 9C. There, the coupling layer 80 is formed in two parts 801 and 802, in the manner of a two-part press-on plate, which are pushed from the left or right over the flange-like rear face 252 of the holder and there hold the holder 25. For this purpose, screws 81 held under tension by springs 82 are again used, as shown in FIG. 9C.

The output optical system 30 terminating the light source, e.g., in the form of a diffuser 30, has, for example, a precisely defined scattering characteristic and as high a transmission as possible.

If the output optical system 30 (for example, shown in FIG. 4) is designed as a diffuser, the diffuser 30 can be a stochastic diffuser or a holographic diffuser. Alternatively, the diffuser is designed as a volume diffuser (see variant according to FIG. 4(C)).

The output optical system 30, e.g., designed as a stochastic or holographic diffuser, comprises, for example, a substrate 31 (see FIG. 4(B)) on which a (thin) light-scattering layer 32 is applied to or is integrated into the surface, wherein the substrate 31 covers the light exit end 212 of the lensless collector optical system 20 (see FIG. 4(A)), and wherein the layer 32 points in the direction of the environment that is to be illuminated. Of course, the layer 32 can also be formed differently, whereby subsections can have a surface normal which does not point directly in the direction of the environment that is to be illuminated.

The substrate 31 can consist of a glass or an optical plastic. The layer 32 may be fused with the substrate 31—for example, when the glass or plastic has been processed by laser engraving or etching of the substrate surface.

The output optical system 30 can thus be designed as a diffuser disk.

The output optical system 30 covers the light exit end 212 of the lensless collector optical system 20 such that the interior 210 of the collector optical system 20 is environmentally sealed at the light exit end 212.

The output optical system 30 can, for example, (in addition to its optical function) simultaneously form a watertight and dust-tight closure of the spotlight 100 against the environment. For this purpose, the output optical system 30 is fastened, for example, to the housing 40 of the spotlight 100. In this way, the entire spotlight 100 is environmentally sealed at this location, and, in this variant, the output optical system need not necessarily be connected in a sealing manner to the collector optical system 20.

If possible (with respect to the materials), any surface of a plastic or glass element of an embodiment of the light source through which light passes (for example, the output optical system 30) is provided with an anti-reflection coating. Previously reflected beams are now also guided through, and this increases the efficiency and the quality of the image. So-called “interfacial reflection” can be reduced, for example, by an additional anti-reflection coating from 4% to 0.5%.

According to one embodiment, the output optical system 30 is formed in one piece. That is to say, the output optical system 30 can be monolithic and, in this property, can adjoin the collector optical system 20 formed, for example, as an internally mirror-coated reflector.

According to another embodiment, the output optical system 30 is of multi-part design—for example, in two parts. In this case, for example, a glass pane is provided which covers the light exit end 212 of the collector optical system 20 designed, for example, as an internally mirror-coated reflector. A holographic diffuser can be attached to this glass pane.

Figure 10:
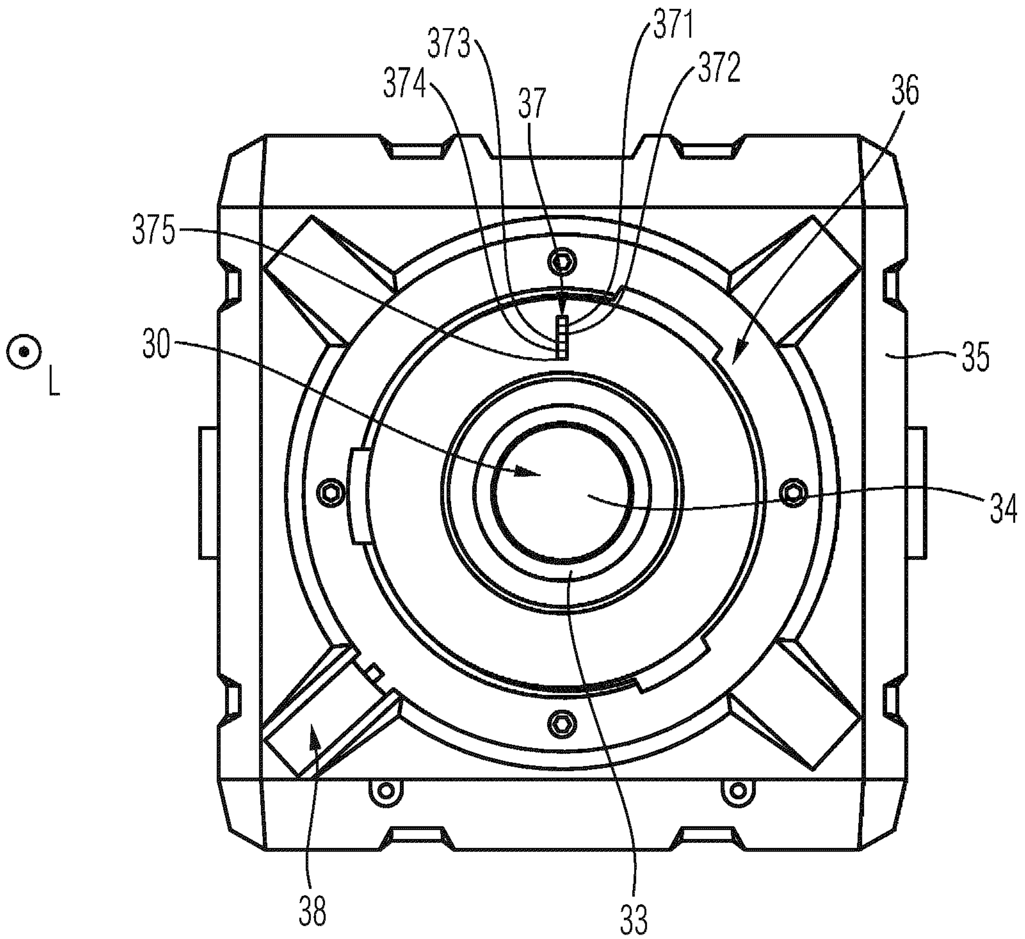
FIG. 10 schematically and by way of example, a plan view of an output optical system of a light source according to several embodiments.

FIG. 10 shows an exemplary embodiment of the output optical system 30. In this embodiment, the output optical system 30 is formed in two parts; here, a glass pane 33 closes the light exit end 212 of the collector optical system 20 designed, for example, as an internally mirror-coated reflector. The glass pane 33 thus receives the light collected and mixed by the collector optical system 20, and transmits it along its thickness in the light exit direction L. A holographic diffuser 34 is provided on the glass pane 33 and receives and outputs the light transmitted by the glass pane 33.

The further optional features relating to the output optical system 30 described below on the basis of FIG. 10 can be implemented irrespective of whether the output optical system is formed in one piece or in multiple parts.

For example, the light source comprises a frame structure 35 via which the output optical system 30 is coupled to the collector optical system 20. For this purpose, the frame structure 35 frames the output optical system 30, for example. In addition, a coupling structure 36 also framed by the frame structure 35 is provided, which is arranged between the frame structure 36 and the output optical system 30 and is designed to form a mechanical coupling with a secondary optical system (not shown here). The coupling structure 36 includes, for example, a flange with a bayonet closure for attaching the secondary optical system. The light source can thus, advantageously, serve as a basis for forming a series of different kinds of spotlights; depending upon the application purpose, a corresponding secondary optical system can be selected and mechanically coupled to the light source via the coupling structure 36.

Furthermore, an interface 37 with a number (five, for example) of lines 371-375 is provided for the transfer of data, control, and/or power signals between the secondary optical system and the light source, wherein the interface 37 can be connected to the control device 70. The control device 70 can thus also act on the secondary optical system in terms of control, and/or data can be exchanged between the secondary optical system and the light source. An inserted optical system can be unlocked via a slider 38.

In order to identify the light source, e.g., in order to determine an article and/or serial number of the light source, as well as, possibly, data related thereto (such as a product specification, a user manual, etc.), a machine-readable code, such as a QR code, can be attached to the carrier 10—for example, to the front side thereof

The invention claimed is:

1. A light source for a spotlight, comprising:

(i) a carrier with a single-layer circuit board, a plurality of LEDs of N>2 different color arranged on the carrier, and an N number of current lines for supplying the LEDs, the current lines forming no crossing regions in a vertical projection of an envelope of the LEDs;

(ii) a lensless collector optical system for collecting and mixing the light emanating from the LEDs;

(iii) an output optical system position to receive light from the collector optical system and outputting it towards a desired area;

(iv) at least one control device for controlling the plurality of LEDs;

(v) a holder, wherein the collector optical system is embedded in the holder, and the holder having a front face adjoining the output optical system, and a rear face with a flange portion; and (vi) a coupling layer configured to attach the flange portion to the carrier.

2. The light source according to claim 1, wherein neither individual lenses for the LEDs nor an individual lens array are provided between the output optical system and the LEDs.

3. The light source according to claim 1, wherein the collector optical system forms a primary optical unit of the light source and does not comprise a lens arrangement with at least one lens spanning the entirety of the LEDs.

4. The light source according to claim 1, wherein the output optical system (comprises a substrate on which a light-scattering layer is applied, wherein the substrate covers a light exit end of the collector optical system.

5. The light source according to claim 1, wherein the output optical system covers the light exit end of the collector optical system so that the interior of the collector optical system is environmentally sealed at the light exit end.

6. The light source according to claim 1, wherein the carrier is a ceramic carrier, and the lines are formed as conductor tracks applied to the carrier, by being laminated onto the carrier or deposited thereon by means of a physical or chemical process.

7. The light source according to claim 1, wherein the output optical system comprises a diffuser.

8. The light source according to claim 7, wherein the diffuser is a holographic diffuser.

9. A spotlight for illuminating at least one of a film, studio, stage, event, or theater environment, the spotlight comprising a light source according to claim 1.

10. The spotlight according to claim 9, wherein the output optical system is attached to a housing of the spotlight and environmentally seals the spotlight at this location.

11. The light source according to claim 1, wherein the collector optical system comprises an internally mirror-coated reflector that surrounds the entirety of the LEDs and, in the interior of the reflector, mixes the light emanating from each of the LEDs and outputs it, with a reduction in the emission angle, at a light exit end of the reflector.

12. The light source according to claim 11, wherein the reflector is formed from a mirrored sheet metal winding.

13. The light source according to claim 11, wherein neither individual lenses for the LEDs nor an individual lens array are provided between the output optical system and the LEDs.

14. The light source according to claim 11, wherein the reflector is formed with a polygonal cross-sectional area increasing in the light exit direction.

15. The light source according to claim 14, wherein the reflector is formed from a mirrored sheet metal winding.

16. The light source according to claim 11, wherein the output optical system directly adjoins the light exit end of the reflector.

17. The light source according to claim 16, wherein the reflector is formed with a polygonal cross-sectional area increasing in the light exit direction.

18. The light source according to claim 16, wherein the reflector is formed from a mirrored sheet metal winding.

19. A light source for a spotlight, comprising:

(i) a carrier with a single-layer circuit board, a plurality of LEDs of N>2 different color arranged on the carrier, and an N number of current lines for supplying the LEDs;

(ii) a lensless collector optical system for collecting and mixing the light emanating from the LEDs;

(iii) an output optical system position to receive light from the collector optical system and outputting it towards a desired area;

(iv) at least one control device for controlling the plurality of LEDs;

(v) a holder, wherein the collector optical system is embedded in the holder, and the holder having a front face adjoining the output optical system, and a rear face with a flange portion; and (vi) a coupling layer configured to attach the flange portion to the carrier; wherein crossing regions of the current lines in at least one of in the carrier, above the carrier, or below the carrier, are formed exclusively in those regions which do not overlap any vertical projection of each of the LEDs.

* * * * *